United States Patent Office 3,694,190
Patented Sept. 26, 1972

3,694,190
PROCESS FOR RECOVERING ALUMINUM
FROM DROSS
Benny Langston, Crown Point, Ind., assignor to
U.S. Reduction Co.
No Drawing. Filed Mar. 18, 1970, Ser. No. 20,804
Int. Cl. C22b 7/00, 21/00
U.S. Cl. 75—68 R    3 Claims

ABSTRACT OF THE DISCLOSURE

A method of reclaiming aluminum from dross by heating a mixture of a flux and dross to produce a bath consisting of a lower layer of molten aluminum, an intermediate layer of oxides and other impurities and an upper layer of raw materials and withdrawing the intermediate layer of oxides and other impurities at the interface between the aluminum layer and the intermediate layers so as to remove higher density materials and prevent the formation of a barrier between the upper and lower layers.

BACKGROUND OF THE INVENTION

The present invention relates generally to the reclaiming of aluminum from by-products and more particularly to an improved method for recovering aluminum from dross.

In the refining of aluminum by the primary aluminum producing industry, the resultant by-product has, in many instances, a large percentage of aluminum, combined with oxides, principally aluminum oxide, and other impurities. Heretofore, it has been common for the primary industry to sell the by-product to a secondary smelter, who further processes the by-product to reclaim substantially all of the aluminum.

The secondary smelter further processes the by-product and attempts to reclaim all of the aluminum from the oxides and other impurities or non-metallics. Generally, this has been accomplished in a process, which may be termed a "batch process." In this process, the by-product and a certain amount of flux are heated to produce a molten bath and the bath is thus transformed into a lower layer of molten aluminum and an upper layer of oxides and other impurities. After a predetermined period, the heating is discontinued and the molten aluminum is withdrawn while the oxides and other impurities, commonly referred to as the "slag," are physically removed, as by scraping.

In recent years, the primary industry has realized that the by-product from the original refining operation contains a substantial percentage of aluminum. Thus, many of the primary industry refiners have resorted to further processing of the original by-products to remove an additional percentage of aluminum. In one of the processes utilized by the primary refiners, the processing of the by-product to remove this additional percentage of aluminum produces a final by-product or dross having a rather small particle size.

Secondary smelters have encountered considerable difficulty in recovering all of the aluminum from a small particle size or dross. For example, in processing aluminum dross of the above type, which generally has a metal concentrate of less than 50%, the increased amount of non-metallics has made it necessary to considerably reduce the heating time so as to prevent the formation of a "slag" layer which has a density that is too high to permit ready removal of the "slag" after the heating operation is discontinued. Furthermore, it was found that a large percentage of the aluminum remained in the "slag" layer and was thus not recovered.

Thus, there is an urgent need for a method of reclaiming substantially all of the aluminum in an efficient manner from a by-product that has a particle size which is predominantly small.

SUMMARY OF THE INVENTION

It has been determined that aluminum can successfully be removed from a dross having a small particle size by maintaining the layer of oxides and other impurities above a predetermined density or below a predetermined viscosity. Stated another way, it has been determined that, for successful recovery of aluminum from a material having a small particle size, it is necessary to prevent the formation of a barrier between the raw materials, normally floating on the surface of the bath, and the lower molten aluminum layer.

According to the present invention, virtually all of the aluminum contained in a dross, having a particle size which is predominantly —10 mesh U.S. Standard sieve, by heating a mixture of flux and dross to melt the mixture and separate the mixture into a lower layer of molten aluminum, an intermediate layer of oxides and other impurities and an upper layer of raw materials and withdrawing the intermediate layer just above the surface of the molten metal layer so as to remove the higher density material and prevent the formation of a barrier which will preclude molten aluminum from passing through the intermediate layer. By maintaining the intermediate layer in a flowable condition at all times, additional raw materials may be periodically supplied to the upper surface of the bath and the heating process continued so as to obviate the necessity of removing aluminum by the heretofore common batch process.

More specifically, the present method contemplates heating a mixture of aluminum, oxides and other impurities and a flux, which may be an equal mixture of salt and potash, having a lower layer of molten aluminum, an intermediate layer of oxides and other impurities and an upper layer of a mixture which contains aluminum; and removing the denser portion of the intermediate layer to maintain the intermediate layer below a density which will preclude the molten aluminum from passing through the intermediate layer to the lower layer.

According to another aspect of the present invention, it has been determined that the fluidity or flowability of the intermediate layer is to some degree dependent upon the ratio of flux to the amount of oxides present in the by-product as well as the temperature of the bath. Thus, according to a further aspect of the present invention, the flux to oxide ratio is greater than 0.75 to 1 and the mixture is heated to a temperature greater than 1250° F. This will further assist in maintaining the intermediate layer in a fluid or flowable condition.

While there is no limit as to the amount of flux which can be added to the dross, it has been found that a practical limit of flux to oxide and other impurities ratio is 1.25 to 1. When this ratio is exceeded, the flux can no longer be effectively utilized.

EXAMPLE

The method of the present invention was successfully practiced by accurately determining, by chemical analysis, the amount of aluminum in the dross. Based on this value, the total weight of non-metallics or oxides and other impurities was calculated.

A predetermined amount of flux of salt and potash was melted in a smelting furnace and, after the flux was in a molten condition, dross in sufficient quantity so that the weight of the oxides and other impurities was equal by weight to the flux in the furnace. The mixture was heated to a surface temperature in the range of 1400° to 1600° F. to produce a bath having a lower metal layer, an intermediate oxide and impurity layer and an upper dross and flux layer. Thereafter, dross and flux were periodically supplied to the surface of the bath and portions of the intermediate oxide and impurity layer removed by withdrawing the higher density oxides just above the interface between the lower and intermediate layers. By periodically removing the denser oxides from the intermediate layer, the density of the intermediate layer was maintained at a level which would allow the molten metal in the upper layer to pass by gravity through the intermediate layer and be received into the lower molten metal layer to be subsequently recovered.

It should be noted that while reference has been made to an intermediate and an upper layer there is no clear division between the two layers. The portion of the melt above the molten metal layer is a molten mass with the lower portion consisting principally of oxides and other impurities while the surface of the melt is molten flux with dross in various stages of transformation. For purposes of claim interpretation, the division between the upper and intermediate layers is at the point where transformed oxides are present in the molten flux.

Also, while the density of the molten aluminum is less than the density of the oxides and other impurities, through some phenomenon that is not understood, the molten aluminum will settle to the bottom of the furnace and the non-metallics will float on the molten metal with a clear interface between the two layers.

What is claimed is:

1. A method of reclaiming aluminum from dross which comprises the steps of heating a mixture of a flux and dross to melt the aluminum and to separate the mixture into a lower layer of molten aluminum, an intermediate layer of slag and an upper layer of raw materials; and intermittently withdrawing the slag layer by removing slag from adjacent the interface between said aluminum layer and said slag layer whereby to remove the higher density slag to prevent the formation of a barrier between said upper and lower layers while maintaining said upper and lower layers in a molten condition within the furnace.

2. A method as defined in claim 1, in which the dross includes metal oxides and other impurities and the flux to oxides ratio is in the range of 0.75–1.25 to 1.

3. A method as defined in claim 1, in which the mixture is heated to a surface temperature greater than 1400° F.

References Cited

UNITED STATES PATENTS

| | | | |
|---|---|---|---|
| 2,987,391 | 6/1961 | Foster et al. | 75—68 |
| 2,526,474 | 10/1950 | Lewis | 75—65 R |
| 1,180,435 | 4/1916 | Robison | 75—68 R |
| 2,481,591 | 9/1949 | Heilman et al. | 75—68 RX |
| 2,768,075 | 10/1956 | Sterental | 75—68 R |

FOREIGN PATENTS

| | | | |
|---|---|---|---|
| 520,533 | 4/1940 | Great Britain | 75—68 |

HENRY W. TARRING II, Primary Examiner

U.S. Cl. X.R.

75—65